United States Patent [19]

Morganti

[11] 3,728,684

[45] Apr. 17, 1973

[54] DYNAMIC SCANNING ALGORITHM FOR A BUFFERED PRINTER

[75] Inventor: Victor M. Morganti, Arlington, Mass.

[73] Assignee: Honeywell Inc., Minneapolis, Minn.

[22] Filed: Aug. 5, 1970

[21] Appl. No.: 61,204

[52] U.S. Cl. ....................340/172.5

[51] Int. Cl. ....................G06f 3/12

[58] Field of Search ....................340/172.5

[56] References Cited

UNITED STATES PATENTS

| | | | |
|---|---|---|---|
| 3,564,512 | 2/1971 | Osborne | 340/172.5 |
| 3,350,025 | 4/1968 | Ragland | 340/172.5 |
| 3,432,810 | 3/1969 | Cordero | 340/172.5 |
| 3,387,280 | 6/1968 | Bina | 340/172.5 |
| 3,413,611 | 11/1968 | Pfuetze | 340/172.5 |
| 3,417,374 | 12/1968 | Pariser | 340/172.5 |
| 3,561,354 | 2/1971 | Mrkvicka | 340/172.5 |

OTHER PUBLICATIONS

IBM Technical Disclosure Bulletin, Vol. 12, No. 1 June 1969 "Table Look-Up Pipeline" by Bliss & George, page 77.

*Primary Examiner*—Gareth D. Shaw
*Assistant Examiner*—Paul R. Woods
*Attorney*—Fred Jacob and Leo Stanger

[57] ABSTRACT

A buffered line printer adapter capable of accepting multiple lines of data and control characters from a central processor memory, and dynamically expanding the data during a print scan cycle, by means of a hardware algorithm which operates on the control characters contained in the buffer memory.

12 Claims, 8 Drawing Figures

VICTOR MORGANTI
*Inventor*
By Anthony J. Sarli Jr.
*Attorney*

VICTOR MORGANTI
Inventor
By Anthony [signature]
Attorney

VICTOR MORGANTI
*Inventor*

By Anthony J. Earl, J.
*Attorney*

FCC OPERATION DURING LOAD CYCLE

VICTOR MORGANTI
Inventor

By Anthony J. Sarli
Attorney

FCC OPERATION DURING PRINT AND COMPARE CYCLE

VICTOR MORGANTI
*Inventor*

By [signature] *Attorney*

DYNAMIC SCANNING ALGORITHM FOR A BUFFERED PRINTER

BACKGROUND OF THE INVENTION

1. Field of the Invention

This invention generally relates to a buffered line printer control unit, and more particularly, to a buffered line printer control unit capable of dynamically expanding data contained in its buffer memory to simulate a memory of much greater size, so as to produce multiple lines of printed text from a single buffer-load operation.

2. Description of the Prior Art

Devices are known which utilize a buffer memory with peripheral devices particularly those peripheral devices which are relatively slow in speed as compared to the speed of the associated central processing unit. If a buffer memory were not used, the processor or processor channel would be utilized inefficiently in transferring data, on demand, to the slow peripheral units. With a buffer memory, however, data may be transferred at a rapid rate from the central processor main memory to the buffer memory, where it is later accessed by the peripheral device at a lower speed. This, of course, allows the central processor or processor channel to be free for the major portion of the peripheral device's operating cycle, during which time it may be performing various arithmetic operations or servicing other peripheral devices.

In one such buffered peripheral unit, in this case a printer unit, data transfer between the processor main memory and the buffer memory in the peripheral unit is accomplished by accessing a portion of the processor main memory and, through control logic, expanding the data contained in a segment thereof into a full one-print-line record in the peripheral buffer memory. In that case, due to the appearance of spaces and formatting commands, a 20 or 30 character portion of main memory may be used to fill an entire 132 character buffer of the peripheral unit. When the printer's scan of the 132 character buffer is completed and that line printed, the central processor must be again accessed in order to transfer the next expanded 132 character segment from the next memory locations, which again may total only 20 or 30 positions in main memory.

In another system comprising a key-to-tape data preparation unit, each peripheral is accessed until a record-length operation is completed. If the central control unit (CCU) memory contains, for example, 400 characters, at least three lines of print, and possibly many more, may be contained in the CCU memory. In prior art devices, 132 characters would be loaded into the printer buffer and scanned and printed while stalling the CCU and preventing further operations. After the first line (132 characters) is printed, another load cycle is performed and the second line printed. Since, with the use of formatting characters, 132 characters or one buffer load may be obtained from a very few characters in the CCU memory, many load and print cycles may be required to complete one 400 character transfer.

In either case, the CCU and/or the CCU channel will be stalled for excessive time periods. In an efficient system, it would be desirable to perform a memory to memory transfer of all data to be printed for as many lines as are defined in main memory, thus reducing the CCU and/or the CCU channel-busy time.

This would imply that the buffer memory of the printer device control area be 132 locations times the maximum number of print lines. This obviously would require a rather large buffer memory in the printer device control area. The instant invention employs an algorithm for simulating a large logical memory while using a small physical buffer memory to eliminate the aforementioned problems.

SUMMARY OF THE INVENTION

Briefly, the invention herein disclosed comprises a buffered line printer control unit which is capable of accepting up to 400 characters from a processor main memory during a single load cycle, the full contents of the buffer memory containing both data and control characters. The buffer memory is then scanned by the printer control logic to expand the data into a logical memory having a multiplicity of lines each having 132 positions. When a full print line of text has been scanned, which may consist of only 20 or 30 characters in the physical buffer memory, a memory address pointer is set to begin the next printer scan at the next succeeding character location in the buffer memory. Thus, a large number of printed lines may be loaded into the printer unit with only a single access of the processor main memory.

OBJECTS

It is an object, therefore, of the instant invention to provide an improved dynamic scanning algorithm for a data processing printer.

It is a further object of the invention to provide a buffered line printer with the capability of dynamically expanding data from the buffer memory during a printer scan cycle.

A still further object of the invention is to provide an improved printer buffer which is capable of accepting data in blocks larger than a printed line block to provide a multiple line print from a single buffer load cycle.

Other objects and advantages of the invention will become apparent from the following description of a preferred embodiment of the invention when read in conjunction with the drawings contained herewith.

DESCRIPTION OF A PREFERRED EMBODIMENT

General

Figure 1:
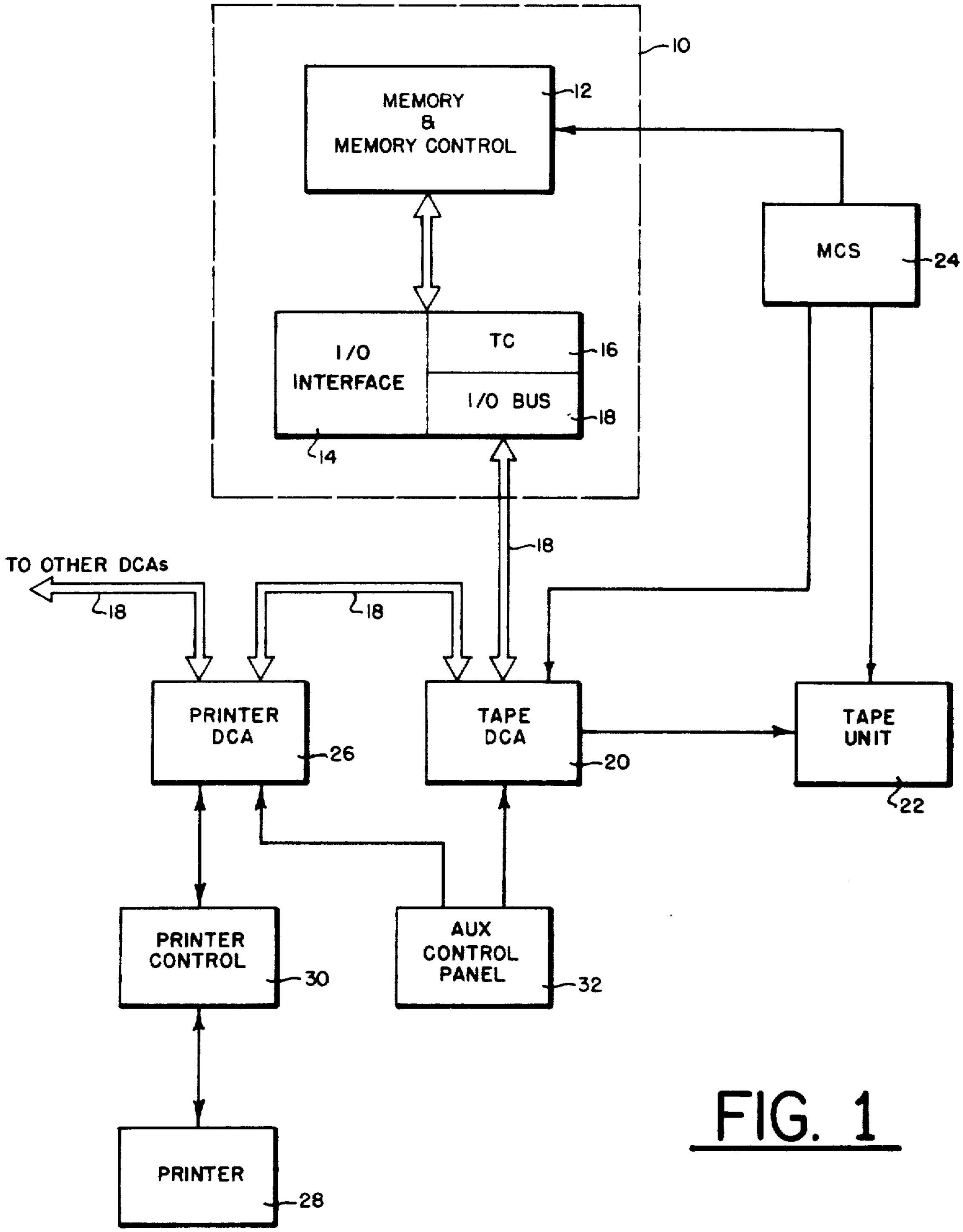
FIG. 1 is an overall block diagram of a system employing the invention.

FIG. 1 is a block diagram of an exemplary system utilizing the instant invention. The system shown is a keyboard-to-tape data preparation system which may be similar to that disclosed in copending application Ser. No. 24, 771 by W. F. O'Neill et al, filed Apr. 1, 1970, and assigned to the assignee of the instant invention.

Such a system comprises a central control unit 10 having a Memory and Memory Controller 12, and I/O interface 14, a Traffic Controller 16, and an Input/Output Bus 18. The system in general will include a keyboard and a tape DCA 20 (device control area). Since the keyboard forms no part of this invention, only the tape DCA is shown, the tape DCA being connected to a tape drive unit 22. A Main Control Station panel 24 contains control information for the central control unit (CCU) 10 and the tape and keyboard units.

A Printer DCA 26 is shown connected to the tape DCA and the I/O Bus portion of the CCU by a multiline serial Input/Output Bus 18. An Auxiliary Control Panel 32 may provide control information for the Printer DCA. A Printer unit is indicated at 28 and has associated therewith a Printer Control Unit 30 containing the electronics used in operating the essentially mechanical printer 28. The Printer Control Unit 30 is connected to the Printer DCA as will be later described.

The memory 12 of the CCU 10 may include a magnetic core memory for storing program and data information derived from a keyboard, tape unit, card reader, or other such input device. For purposes of this discussion, the memory may be a bit serial, character serial memory.

The Traffic Controller unit 16 of the I/O interface 14 contains a Traffic State Sequencer capable of providing four sequentially addressed Traffic States (TS1 to TS4). These states are used to control the addressing sequences of the various adapters connected to the I/O Bus. Once a Traffic State is entered, the state is maintained until the address device has completed a full record length operation. In this instance, since the core memory 12 may be up to 400 characters in length, one record-length operation may be the full 400 characters.

The tape DCA in this instance operates as an input device, i.e., a record is read from tape and placed in memory 12, in Traffic State 1. The printer DCA 26 operates as an output device in Traffic State 3. For this example, traffic states 2 and 4 are not used, but Traffic State 4 might commonly be used as a communications output state when a Communications DCA is attached to the I/O Bus 18.

Figure 2:
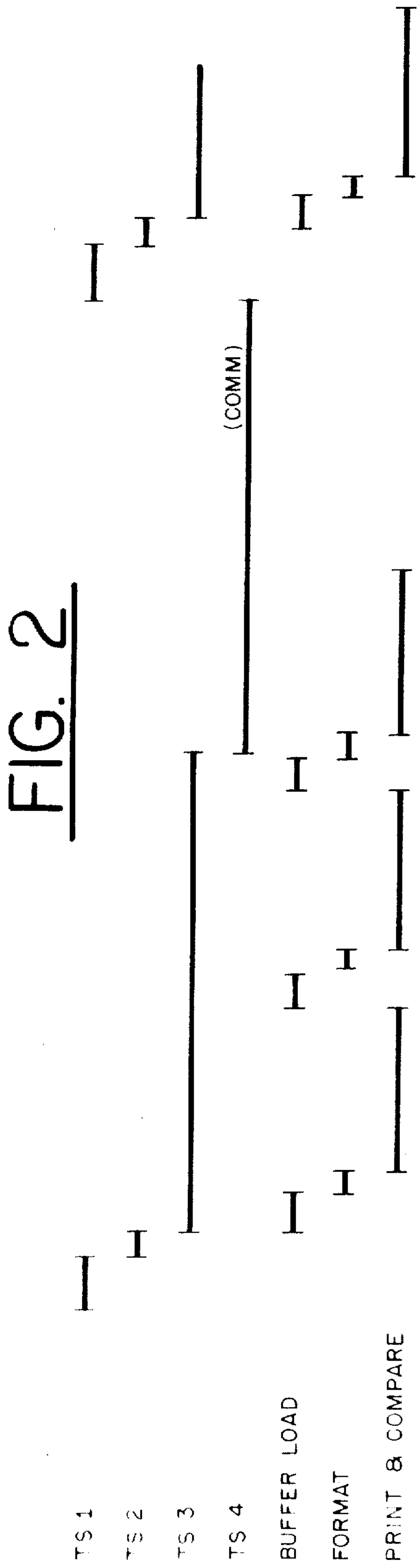
FIG. 2 is a timing diagram showing traffic state sequencing with a conventional buffered line printer DCA.

FIG. 2 is a traffic state timing chart of a buffered line printer not incorporating the features of the instant invention. The device is initialized in Traffic State 1, during which time a record is transferred from magnetic tape to the CCU memory. When a record length operation is complete, the tape DCA releases the CCU from Traffic State 1 and allows the CCU to sequence to Traffic State 2. Since, in this example, no device is active during Traffic State 2, after a short-time out period the CCU is released to sequence to Traffic State 3. In Traffic State 3, the printer DCA validates its address and a buffer load cycle is begun wherein data in the CCU memory is transferred to the printer buffer memory. In parallel to the buffer loading operation, a format cycle is initiated during which time the printer paper is advanced and other formatting details attended to. At the end of the formatting cycle, the print and compare cycle is begun for one record length operation. During the print and compare cycle, the data in the printer buffer memory is extracted and printed. With conventional buffered printers, the printer buffer is 132 characters in length, equivalent to one printed line of data. When the first print and compare cycle is completed, another buffer load cycle must be entered in order to extract the next 132 characters from the CCU memory which may be 400 characters in length. A second format and print and compare cycle is then completed and a third buffer loading operation is begun, which load cycle is followed by a third format and print and compare operation.

At the end of the third buffer load operation, the CCU may be released from Traffic State 3 and allowed to sequence to Traffic State 4 where a communications operation is begun. At the end of the communications operation, the device sequences again to Traffic State 1 where another 400 character record is read from tape, and the process is repeated. It should be noted that, since the buffer memory in the printer is only one line in length (132 characters), the CCU must be stalled in Traffic State 3 throughout the time consuming process cycles (i.e., format and print and compare cycles).

Figure 3:
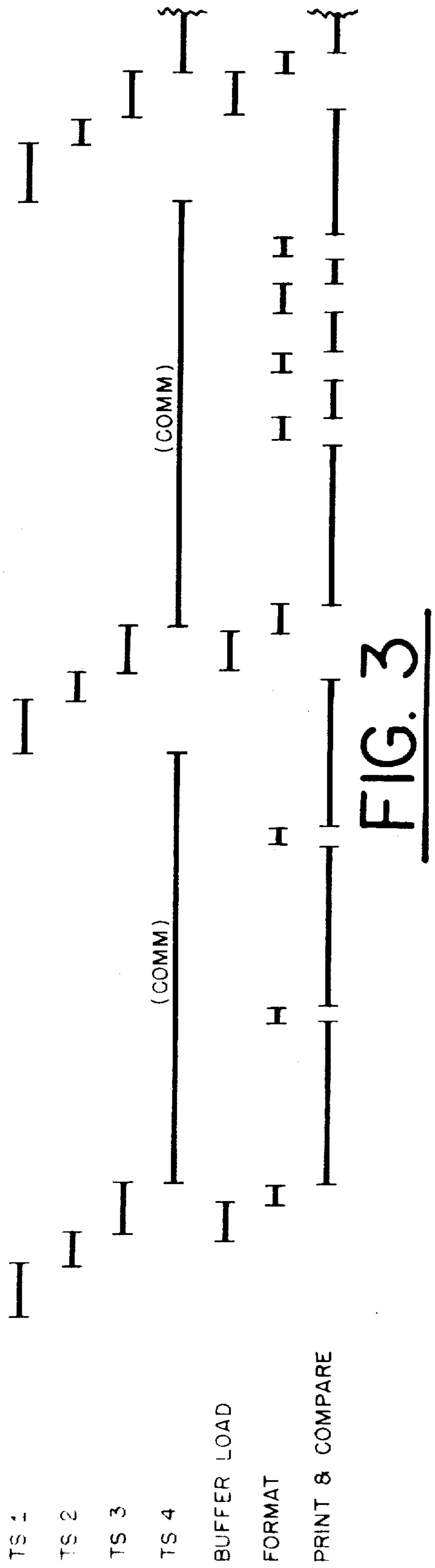
FIG. 3 is a timing diagram showing traffic state sequencing with a buffered line printer DCA employing the features of the instant invention.

FIG. 3 shows a timing chart of a buffered line printer employing the features of the instant invention. Again, the device is initialized in Traffic State 1 and data is transferred from magnetic tape to the CCU memory. Traffic State 2 is inactive, and after a time-out period, the CCU sequences to Traffic State 3. During Traffic State 3, the full 400 character record contained in the CCU memory is transferred to the printer buffer memory and the CCU is immediately released from Traffic State 3 and sequences to Traffic State 4 where the communications operation is begun.

Upon entering Traffic State 3, a buffer load operation and a formatting operation is immediately begun, followed by a print and compare cycle for the first 132 characters of the printer-buffer memory. Since the buffer now contains 400 characters of data, succeeding format and print and compare cycles can be initiated without any further communication with the CCU. FIG. 3 shows three such format and print and compare cycles.

According to another feature of the instant invention, since the printer DCA is capable of scanning and dynamically expanding selected portions of the buffer memory, a large number of lines (up to one hundred) of printed data may be printed from a 400 character load as shown in the second cycle in FIG. 3.

At the end of the first print and compare cycle, which may comprise 132 characters, a second formatting cycle is entered, followed by a second print and compare and then, successively, a third, fourth, and fifth format and print and compare cycles for what may be short printed lines, i.e., lines containing fewer than 132 data characters. Again, as soon as the buffer load operation is completed, the CCU is released from Traffic State 3 and may sequence to Traffic State 4 to complete a communications operation which is time-overlapped with the relatively slow printing operation.

This overlap in processing times for printing and communicating is made possible through the use of a scanning algorithm which allows the printer buffer to be logically as large as 132 times the number of print lines contained in the CCU memory, and through the use of format control characters which are initially contained in the CCU memory and are transferred to the printer buffer along with data characters to be printed. The format control characters (FCCs) provide for space-fill command and end of line commands, thus allowing a full line of print to be generated from a potentially few character positions in the buffer memory. Thus, as the physical buffer memory is scanned, a logical memory is generated which simulates a buffer memory of much larger size.

Format Control Characters

A format control character (FCC) is a specified character which conditions the printer DCA to interpret the next character in the buffer memory as a command rather than data. The FCC may be any available code character but preferably would be a character that is seldom actually used during a printing operation. The invention does provide a method for printing such a character, however, if the need should arise.

During a buffer load cycle, recognition of an FCC causes the DCA to interpret the next character and perform the proper functions as described in the following table.

TABLE I

| Configuration BA8 | 421 Command | Operation |
|---|---|---|
| Onn | nnn Space fill | The FCC pair (that is, the FCC character and the next character) are stored in DCA memory, and no other operation takes place. |
| 110 | 000 Scan ignore | The FCC pair is stored in DCA memory. Subsequent data characters up to and including the next FCC from the CCU are ignored by the DCA (that is, not loaded in the DCA memory). Note, the FCC that terminates this command does not cause the following character to be interpreted as a new command. |
| 111 | 000 Scan next | The FCC pair is stored in DCA memory. The FCC decoder is disabled for one character, allowing the character following the FCC pair to be interpreted as a data character. |
| 100 | 000 Print and continue | The FCC pair is stored in DCA memory, and no other operation takes place. |
| 101 | 000 Print and release | The FCC pair is stored in DCA memory, and the load cycle is terminated. All characters following the print and release command from CCU memory are ignored. |

During a print and compare cycle, recognition of an FCC causes the DCA to interpret the next character and to perform the next functions as described in Table II.

TABLE II

| Configuration BA8 | 421 Command | Operation |
|---|---|---|
| Onn | nnn Space fill | This command instructs the DCA to issue nnnnn (1 through 31) consecutive Print Address Advance signals (without true compares) to the Printer electronics before resuming DCA memory scan. |
| 110 | 000 Scan ignore | This command causes no special operation during a print and compare cycle due to the ignore action during the load cycle. |
| 111 | 000 Scan next | This command disables the FCC decoder for the next character only, so that the next character is scanned as a data character. |
| 100 | 000 Print and continue | This command acts as a marker to define the termination of each memory scan during a print and compare cycle. Following the last scan, the next character in DCA memory is processed as an LAO. Note, if this command immediately precedes the floating end-of-memory marker, it is automatically processed as a print and release command. |
| 101 | 000 Print and release | This command acts as a marker to define the termination of each memory scan during a print and compare cycle. After the last scan, this command allows the DCA to go unbusy and begin the next load cycle. |

The Printer DCA

Figure 4:
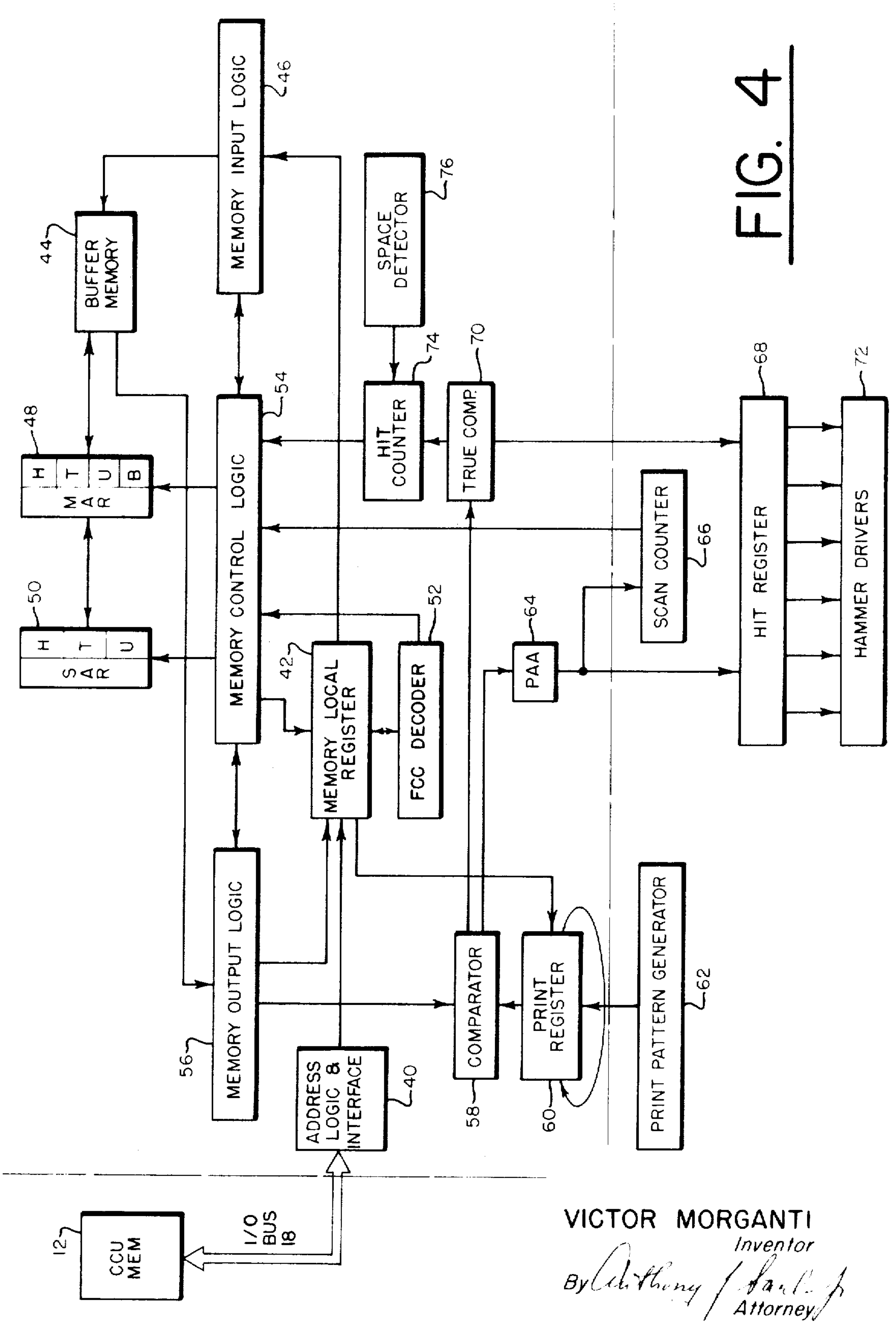
FIG. 4 is a detailed block diagram of the printer device control area together with portions of the central control unit and printer electronics.

FIG. 4 is a detailed block diagram of the printer device control area (DCA) together with portions of the central control unit and printer electronics necessary for an understanding of the instant invention.

The CCU memory 12 is connected via input/output bus 18 to the Address Logic and Interface unit 40 of the Printer DCA. The address logic and the associated memory 42, memory output logic 46 and memory input logic 56 of the DCA may be similar to that disclosed in the copending application of W. F. O'Neill et al. previously cited. The primary function of the Address Logic and Interface is to validate the address of the Printer DCA and prevent a traffic state sequence operation from taking place in the CCU until a record-length operation is completed.

Data derived from the I/O bus is fed to a Memory Local Register 42 from which it is read into the Printer DCA Buffer Memory 44 under the control of Memory Input Logic 46. The address of Buffer Memory 44 is determined by Memory Address Register 48, and certain other address functions, to be later described, are performed in the Storage Address Register 50. The contents of the Memory Local Register 42 which may be a character length shifter register, are monitored by an FCC Decoder 52 which may be AND-gate logic capable of detecting specific characters.

Connected to the output of the FCC Decoder is Memory Control Logic 54 which generates timing pulses for the Memory Input Logic 46 and Memory Output Logic 56, as well as controlling the state of Memory Address Register 48 and Storage Address Register 50. The Memory Control Logic 54 additionally controls the operation of the Memory Local Register 42 and provides an additional control to the Memory Output Logic to determine the path of data being outputted from Buffer Memory 44.

Figure 5:
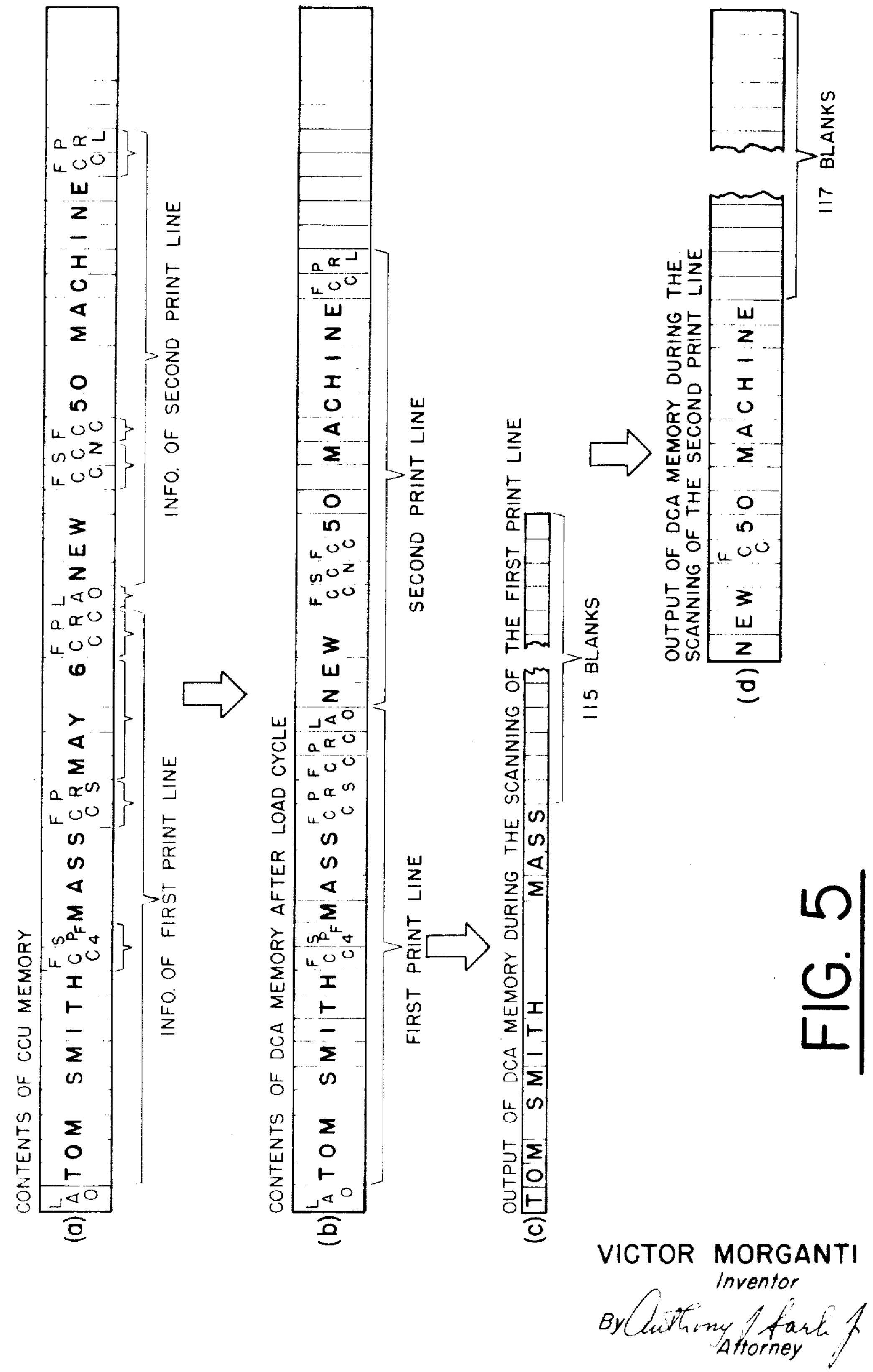
FIG. 5 is a representation of the contents of the CCU memory, the buffer memory, and the logical memory.

The operation of the printer DCA during a Buffer Load operation will be explained with reference to the logic block diagram of FIG. 4, a portion of FIG. 5 showing the relationship between the contents of the CCU memory and the DCA memory after completion of a load cycle, and FIG. 6 which is a flow diagram showing the operation of the Format Control Characters during a load cycle. Additional reference may be made to Table I which shows the operation of the FCC pairs during the load cycle.

Line (a) of FIG. 5 shows the contents of the CCU Memory which will be transferred to the Printer DCA Buffer Memory during the load cycle. The first character of line (a) is a Line Advance Order (LAO) which is merely a formatting character to indicate the number of lines that the printer paper is to be advanced before the line is printed. Discussion of LAO's will be limited in this description, as the operation thereof is conventional and is not necessary for an understanding of the invention. The next nine characters of the CCU Memory are data characters, including a space between M and S. Following the first data field is an FCC followed by a Space Fill Command indicating that four spaces are to be inserted into the printed text. In the load operation, the FCC pair will be stored in the DCA memory and no further operation takes place, as is indicated in Table I. The next four characters (MASS), are a data field and will be transferred directly to the DCA buffer memory. The next following characters comprise an FCC pair indicating a Scan Ignore field, which, as indicated in Table I, stores the FCC pair in the DCA memory but ignores the next data field up to the position where the next succeeding FCC is detected. The ignored field is not stored in the DCA buffer memory. A blank character follows and will be stored in the DCA memory.

The FCC pair following the Scan Ignore field is a Print and Continue Command which is decoded by the DCA as the end of a line and is stored directly in the DCA memory with no further operation taking place. The next following character is a line advance order (LAO) for the next line followed by a data field and an FCC pair directing a Scan Next operation. This causes the FCC pair to be stored in the DCA memory, and the FCC decoder disabled for one data character to allow the FCC character to be ultimately printed as a data character. The next ten characters constitute a data field followed by an FCC pair directing a Print and Release operation indicating that the logical end of memory has been reached. This FCC pair is stored in the DCA memory and no further operation takes place during the load cycle.

Line (b) of FIG. 5 shows the contents of the DCA memory after the load cycle has been completed. The DCA memory now contains all data to be printed and control information. The data to be ignored (derived from the Scan Ignore field in Line (a) ) was not loaded into the DCA memory.

The loading operation takes place in the DCA as follows, with reference to FIGS. 4 and 6:

The Printer DCA is addressed in Traffic State 3 as previously discussed. The Address Logic and Interface 40 requests data from the CCU memory 12. A Data Output Cycle (DOC) is initiated in the CCU and data is read from the CCU memory character by character. As the data goes across the I/O Bus 18, it is stored, character-by-character, in the Memory Local Register 42. The FCC Decoder 52 examines the characters in the Memory Local Register to determine whether an FCC is present. If the character is an FCC, a determination is made as to whether it is a Scan Ignore (PRS) command. If the character is a Scan Ignore command, PRS is set and the character is loaded into buffer memory. The setting of PRS allows all characters up to and including the next FCC to be ignored by the DCA and not loaded into the buffer memory. If the FCC is not a Scan Ignore command, it is examined as a Print and Release (PRL command. If the command is a Print and Release command, PRL is set which terminates the load cycle and causes the buffer memory to ignore any further characters in the CCU memory. If the character is not a Print and Release character, the character is loaded into the buffer memory. Each time a character is loaded into the buffer memory, PRL is checked for a set condition and another Data Output Cycle (DOC) from the CCU Memory is initiated. This process will continue until a Print and Release command is received on the physical end of the CCU memory is reached at which point it can be seen from FIG. 6 that the load cycle is terminated.

Each time a new character is loaded into the Memory Local Register (MLR) for examination by the FCC decoder, the character is shifted out of the Memory Local Register through the Memory Input Logic into a position in the Buffer Memory 44 determined by the Memory Address Register 48 which contains a plurality of counters capable of counting bits, unit characters, tens characters and hundreds characters up to the capacity of the Buffer Memory 44 (in this case 400 characters). As each series of nine bits is counted (there being nine data bits per character), the Memory Address Register sequences one column in the Buffer Memory to Prepare to load the next sequential character.

Figure 6:
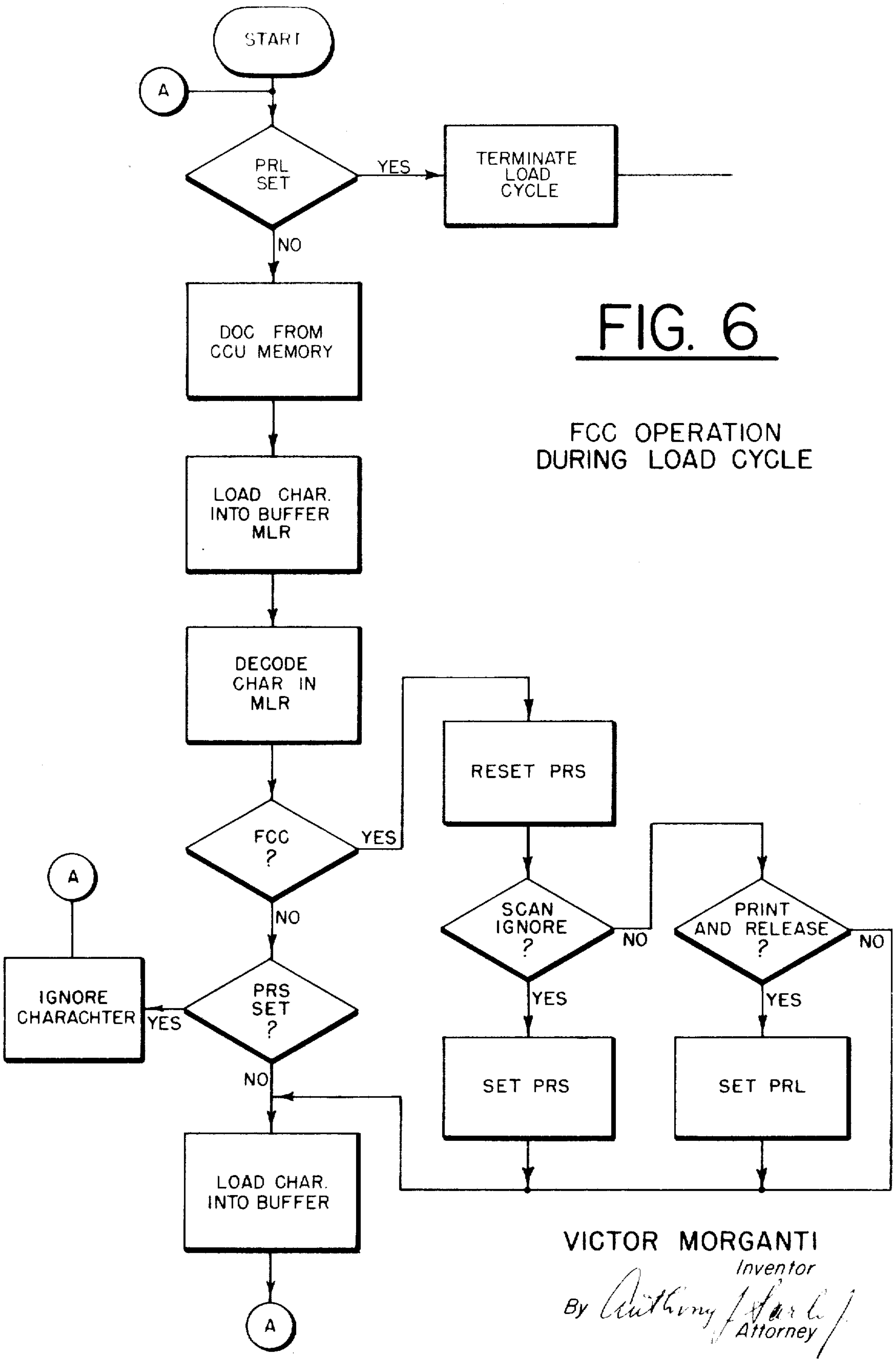
FIG. 6 is a flow chart showing the operation of Format Control Characters during a buffer load cycle.

A comparison of lines (a) and (b) of FIG. 5 shows that the contents of the DCA Memory after the load cycle are precisely the same as the contents of the CCU Memory with the exception of the data field MAY 6 which was ignored since the FCC was a Scan Ignore, or PRS, which set a function as shown in FIG. 6 to ignore the characters following the PRS FCC until the next FCC is reached to reset the PRS function. It should be noted that, in viewing FIG. 6, the PRS and PRL functions are set up to be examined sequentially when it is determined that an FCC is present in the MLR. This is not necessarily, however, the case, since obviously logic could be provided to examine the FCC character for all conditions in parallel.

Print and Compare Cycle

During a conventional Print and Compare cycle, the second character in memory (i.e., the first character is the LAO character and was processed during the format cycle) is read out, under control of the Memory Output Logic 56, to a Comparator 58 where it is compared bit-by-bit, serially, with a character contained in the Print Register 60. The Print Register 60 is a character length shift register into which the Print Pattern Generator 62 in the printer electronics, places the next character to be printed by the line printer. Each time a full character is compared, a Print Address Advance signal is generated by PAA 64. The PAA signal is applied to a Scan Counter 66 which is capable of counting to 132 (the number of characters per line of print). The Scan Counter 66 provides a signal at the end of 132 characters to the Memory Control Logic 54 to indicate that a full line has been scanned and to begin the next scanning cycle for the next letter on the printer drum by extracting the address in the Storage Address Register and placing it in the Memory Address Register. Additionally, the PAA is applied to a Hit Register 68 which is a 132 character register, to advance the markers in the Hit Register 68 for each comparison made. Each time Comparator 58 determines a true comparison of all nine bits of a character, a bit is loaded into the Hit Register 68 from a True Comparison Register 70. As true comparisons are made, the True Comparison Pulse is sequenced through the Hit Register by the PAA signal from 64, and at the completion of a scan, a bit will be present in the Hit Register 68 for each position on the line to be printed with the character presently in the Print Register 60. A set of Hammer Drivers are actuated at 72 for each hit received and the print hammers are driven by conventional means not shown. In addition to supplying a True Comparison Pulse the hit register, True Comparison Register 70 supplies a pulse to a Hit Counter 74 each time a true comparison is made. A Space Detector 76 also provides a pulse to the Hit Counter each time during the first scan of each Print and Compare Cycle that a space is counted, the result being a count from zero to 132 indicating the number of characters and/or spaces actually printed during that Print and Compare Cycle. The space detector 76 may be a simple decoder responsive to a given bit configuration within the scanned portion of the buffer, in this case the configuration representing "space," such as is shown generally as command decoder in U.S. Pat. No. 3,413,609. When the Hit Counter 74 reaches 132, the Memory Control Logic 54 is notified that all spaces and data characters on that line have been printed and that the next Process Cycle should begin. This is effected by advancing the Memory Address Register one position from the end of its current scan as determined by the scan counter and jamming that address into the Storage Address Register. In the next succeeding Print and Compare Cycle, as the Memory Address Register is advanced through the buffer memory, the starting point of that current Print and Compare Cycle will remain in the Storage Address Register. When the scan counter reaches 132 on the next scan, the address stored in the Storage Address Register is loaded into the MAR as previously described, in order to position the memory address register at the proper starting location for the next succeeding printer scan cycle.

Figure 7:
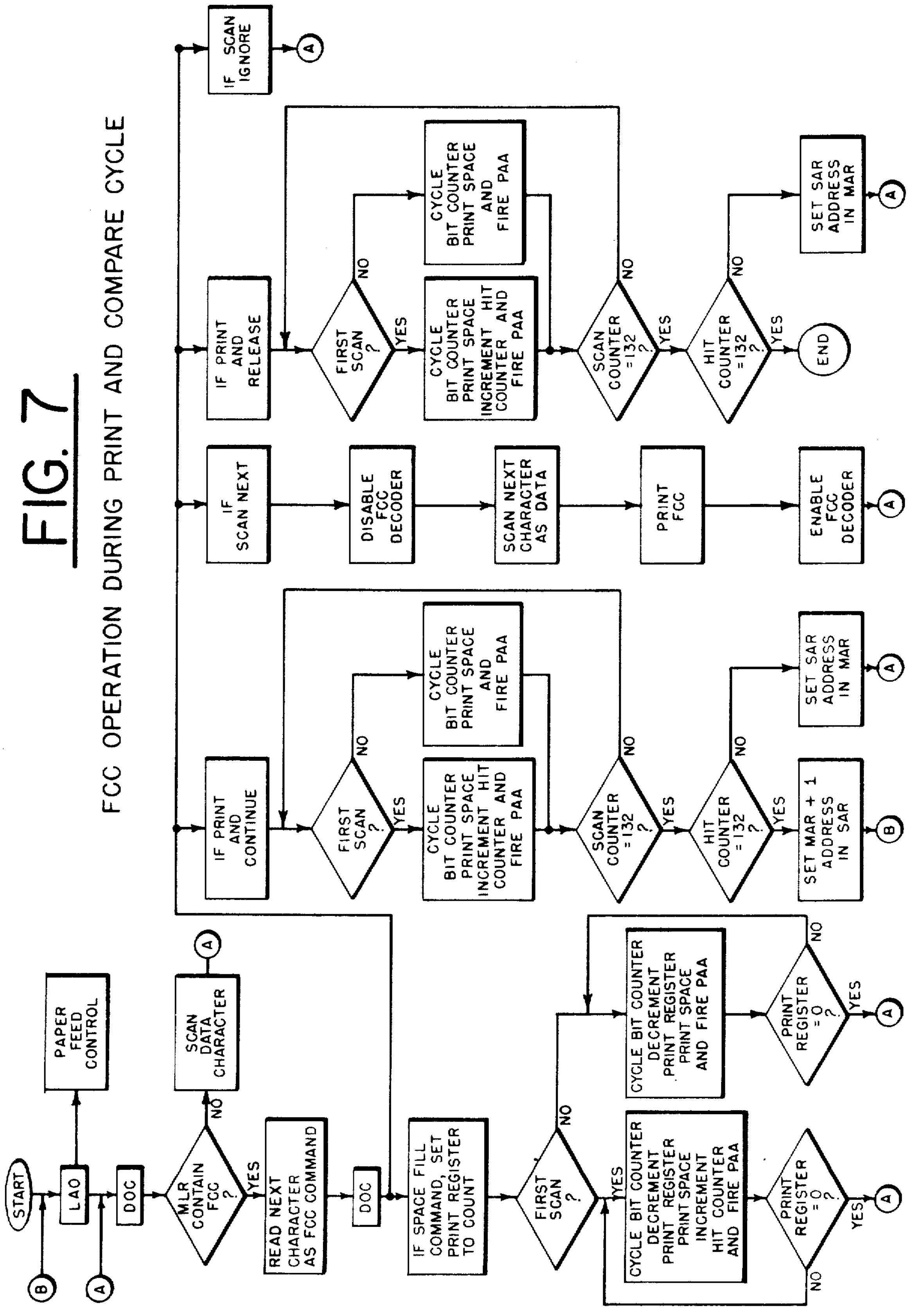
FIG. 7 is a flow chart showing the operation of Format Control Characters during a print and compare cycle.

In discussing FCC operation during a Print and Compare Cycle, reference may additionally be made to FIG. 7 which is a flow diagram showing the sequence of operations after detection of the various combinations of FCC pairs available from the buffer memory, and Table II which is a listing of the operations of the FCCs during a Print and Compare Cycle. Additionally, reference may be made to FIG. 8 which is a timing diagram of a few cycles showing the data output cycles, read and write cycles, bit counter increments, data characters from the logical memory and True Compare and Printer Address Advance cycle generation.

When a Process cycle has begun, a character is extracted from Buffer Memory 44, and, since it is the first character, it is treated as a line advance order (LAO), and is utilized to drive the paper feed mechanism of the printer by means not shown.

After the format cycle terminates, a second Data Output Cycle is initiated and the data loaded into the Memory Local Register 42 through Memory Output Logic 56, which derives its timing, as does the Memory Input Logic, from the Memory Control Logic 54. It should be noted that, as data is placed into the Memory Local Register on a read cycle RDC, a write cycle WRC is immediately initiated to transfer the data back into its original position in the Buffer Memory so that the Buffer Memory always contains the same information until it is specifically altered by the next load cycle from the CCU Memory.

With the next succeeding character in the MLR, the character is examined for the appearance of an FCC. If the MLR does not contain an FCC, the character is scanned as a data character and another DOC is initiated, loading the next succeeding character into the MLR through the mechanism of advancement of the Memory Address Register and the reading of the memory location by the Memory Output Logic 56.

If the MLR does contain an FCC, the FCC Decoder is activated and another Data Output Cycle is initiated to extract the FCC instruction from the Buffer Memory. If a Space Fill Command, SPF, is encountered, the contents of the Memory Local Register 42 are read out under control of the Memory Output Logic and Memory Control Logic, respectively, into the Print Register 60 which is now conditioned to perform as a decrementing counter. Since the FCC code for a Space Fill Command contains the number of spaces to be filled (see Table II), the character as loaded from the Memory Local Register contains the number of spaces to be printed by the printer. If the device is operating during its first scan of a particular segment of a Buffer Memory, the operation of the Space Fill Command is as follows: the Bit Counter in the Memory Address Register is cycled, and each time a character length cycle is complete, the Print Register 60 is decremented by one count. A space is printed, and the Hit Counter 74 is incremented by Space Detector 76. Additionally, Print Address Advance PAA 64 is fired to produce a PAA pulse which pulse is counted by Scan Counter 66 and used to sequence Hit Register 68. The Print Register is then examined for a zero condition, if the Print Register has not decremented to zero, the process of cycling the bit counter, decrementing the print register, printing a space, incrementing the hit counter 74, and firing PAA 64 is repeated. If the Print Register now decrements to zero, a new Data Output Cycle is initiated by the Memory Control Logic. On any scan subsequent to the first scan, the process is essentially the same with the exception that the Hit Counter 74 is not incremented since all space hits were counted on the first scan through the active portion of the Buffer Memory. Since, as previously discussed, the function of the Hit Counter 74 is to determine when all 132 characters have been printed, it is necessary only to count spaces on the first scan through the active area of the Buffer Memory.

Again, if the Print Register 60 has not decremented to zero at this point, the process is repeated until the Print Register does contain a zero, at which point a Data Output Cycle is initiated by the Memory Control Logic.

If a Print and Continue (PRC) FCC is detected, the Hit Counter 74 is incremented and a space is printed. From Table II it can be seen that the function of a Print and Continue command is to notify the printer that the logical end of a line has been reached and to fill all remaining print positions in that line with spaces. When the space has been printed, the scan counter is examined to see if 132 characters (one full line) have been reached. If not, the Hit Counter is again incremented and another space is printed. When the Scan Counter reaches 132, the Hit Counter is examined for a full count (132) condition. If the Hit Counter is at 132, indicating that all characters on that line have been printed or accounted for, the next succeeding address in the Memory Address Register is loaded into the storage Address Register to point to the beginning Buffer Memory location for the next succeeding scan cycle. Since a new line is begun, the next character extracted from the Buffer Memory will be a Line Advance Order and will operate the paper feed control. If the Hit Counter 74 had not reached 132, indicating that some characters still remained to be printed, the address currently in the Storage Address Register is placed into the Memory Address Register in order to initiate a succeeding scan from its original beginning position of the active Buffer Memory portion. When the MAR address is set from the SAR, a Data Output Cycle is begun and the overall process is repeated.

If the FCC pair is a Scan Next, SCN, command, the FCC decoder is disabled for one character. The next character loaded into the MLR from the Buffer Memory is scanned as a data character and the FCC is printed. The FCC decoder is then again enabled and a Data Output Cycle is initiated. The foregoing operation permits the printing of an FCC character if it is desired to print that character. It should be noted that this requires three memory locations since an FCC pair is required to disable the FCC decoder and allow the next succeeding FCC to be printed as a data character.

If the FCC pair is a Print and Release FCC, PRL, the end of the Buffer Memory has been reached and the routine ends. If a Scan Ignore FCC pair is detected, the next Data Output Cycle is immediately begun.

Lines (c) and (d) of FIG. 5 show the logical memory contents which corresponds to the printed lines resulting from the DCA Memory content after the Print and Compare Cycle previously discussed. Note that the first character in the DCA memory (line b) was an LAO which is ignored during the Print and Compare cycle. The next data field TOM SMITH is printed as shown. In line (b), the character following the H is an FCC pair indicating a Space Fill Command of four spaces. Line (c) of FIG. 5 shows four spaces inserted after the H and before MASS. The next four characters MASS are data characters and are printed as shown. The next FCC pair is a Scan Ignore which causes no operations during the print and compare cycle. As a result, nothing will appear in the printed line indicating its presence. Next is a blank and immediately following is a Print and Continue FCC pair which indicates the end of a line of print and directs the Printer DCA to insert blanks to the end of the line; in this case 114 blanks would be required to make up the 132 character line. Immediately following a PRC FCC pair, since a new line is beginning, the first character is treated as an LAO and ignored during the Print and Compare Cycle. The data field next following is printed as shown and an FCC pair Scan Next SCN is encountered. The character following the SCN is another FCC, but since the FCC Decoder has been disabled for one character, the FCC character (which again may be any character appearing on the line printer drum) is printed as a character. The next ten characters constitute a data field and are printed as contained in the buffer memory until the next FCC pair PRL is encountered. Since PRL is a Print and Release command, the FCC pair marks the end of the logical memory (that memory which appears to the printer, as opposed to the physical end of the buffer memory, character number 400). Since PRL acts, in addition to being an end of memory marker, to fill the remainder of that line with spaces, the remainder of this operation is similar to that of the PRC command previously discussed. In this case, it can be seen from line (d) that 117 blanks would be inserted to complete the line.

Figure 8:
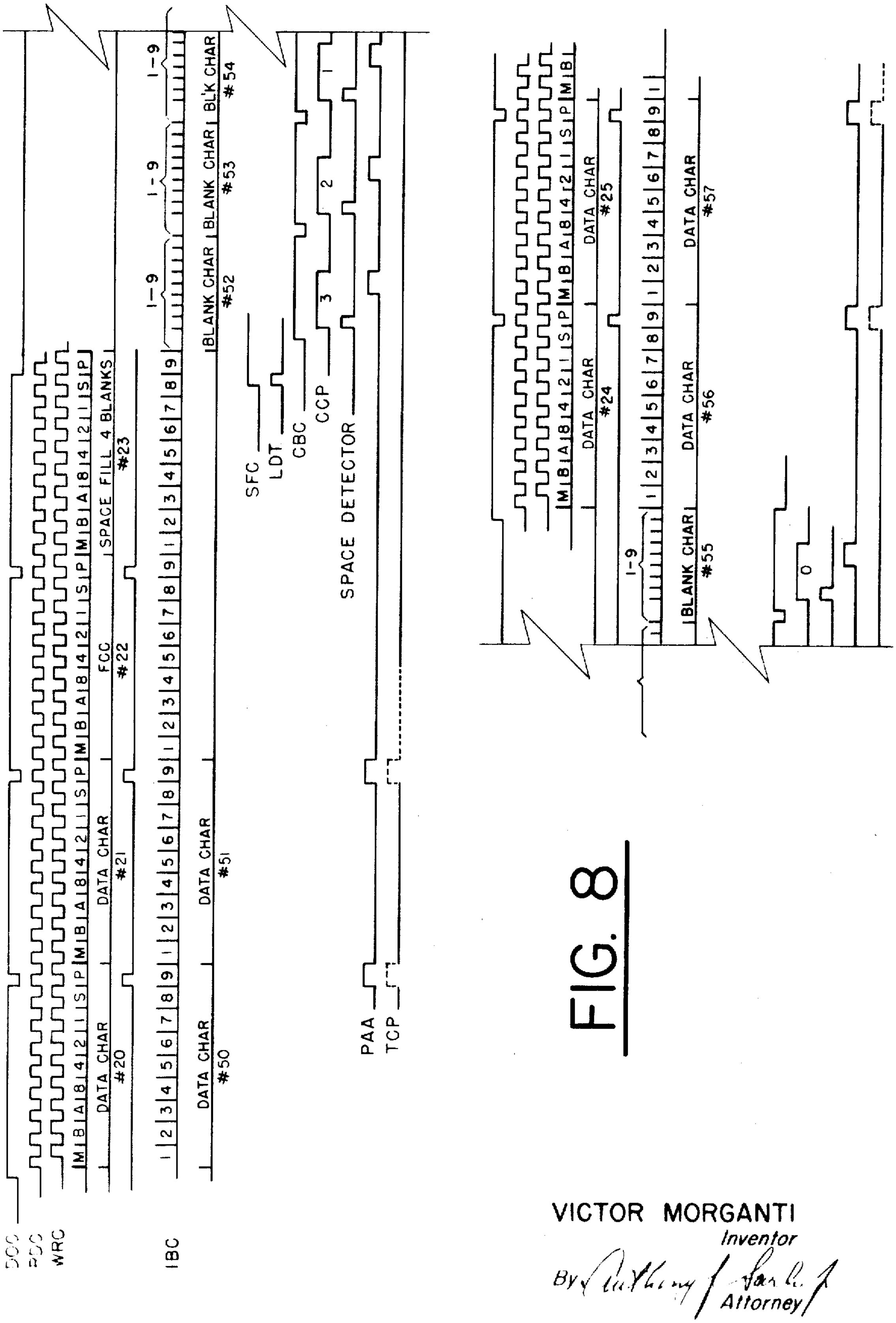
FIG. 8 is a timing diagram showing the timing of certain signals in the device control area.

FIG. 8 is a timing chart showing the major timing and control operations of the Buffered Line Printer DCA. The top line shows the Data Output Cycle which is a pulse of sufficient length to allow read cycles RDC and write cycles WRC to alternately occur in the Memory Input Logic and Memory Output Logic under the control of the Memory Control Logic 54. As shown in FIG. 8, the memory positions 20 through 25 of the Buffer Memory are included. Memory position 20 contains a data character and the nine bits associated therewith are read out of and into the Buffer Memory. Memory position 21 also contains a data character and its associated nine bits are read out and then back into the Buffer Memory.

Memory position 22 and 23 constitute an FCC pair, 22 being the FCC character and 23 being a Space Fill Command instructing the insertion of four blanks in the printed text. This is done by cycling the Bit Counter as shown until the blank characters are inserted. At the time the blank characters are inserted, the pulses to increment the Bit Counter are increased in speed to approximately twice the normal read-write speed. The data in the Logical Memory, that is, the data which is scanned by the printer and simulates the larger memory, is shown having data characters in memory positions 50 and 51. Logical Memory positions 52, 53, 54, and 55 are the positions wherein the Space Fill Command will provide four blanks. Data characters will then be inserted into Logical Memory locations 56 and 57 to be printed in those positions on the printed page.

After the FCC pair is decoded, an SFC pulse is generated indicating a Space Fill Command. This in turn generates LDT to load the SFC character into the Print Register. CBC and CCP cause the Bit Counter to cycle (again at a rapid rate) and CCP decrements the Print Register by one count for each character cycle of the Bit Counter. When the Print Register is decremented to zero, the DOC pulse is restarted which in turn restarts the RDC and WRC pulses for reading and writing the next data characters out of and into Buffer Memory. It can bee seen that CCP causes the Space Detector to emit a pulse with each decrement of the Print Register. The Space Detector, as previously described, increments the Hit Counter during the first scan of the active portion of the Buffer Memory. The PAA and TCP pulses are also shown, a PAA pulse being generated for each data and space character generated, and TCP or true compare pulses being possibly generated at each of the data character positions. Since blanks are not printed, there can be no true compare pulse during the blank generating state. By extrapolation, it is apparent that blank generation operates in the same manner upon the occurrence of a PRC pulse in the Buffer Memory which causes the generation of blanks to fill the remainder of the 132 positions on the printed line.

Having shown and described one embodiment of the invention, those skilled in the art will realize that many variations and modifications can be made to produce the described invention and still be within the spirit and scope of the claimed invention.

What is claimed is:

1. A data processing system comprising:
   a. a central processor having a memory,
   b. a peripheral device control area connected to said central processor,
   c. said device control area having a buffer memory,
   d. means for transferring data and control characters from said central processor memory to said buffer memory,
   e. a printer connected to said peripheral device control area, said printer having a print register for storing a character to be scanned for printing,
   f. means responsive to said control characters for dynamically expanding the data in said buffer memory so as to form a logical memory which appears to said printer as a memory of relatively larger size than said buffer memory, and
   g. means responsive to said means for dynamically expanding, for entering a character representing a number into said print register indicative of a number of spaces to be printed by said printer.

2. A data processing system as set forth in claim 1 further comprising first means for transferring an address in said storage address register to said memory address register, said first means including a control character in said buffer memory.

3. A data processing system as set forth in claim 2 further comprising second means for transferring an address related to the address in said memory address register to said storage address register, said second means including a control character in said buffer memory.

4. A data processing system comprising:
   a. a central processor having a memory,
   b. a peripheral device control area connected to said central processor,
   c. said device control area having a buffer memory and a memory address register for accessing said buffer memory,
   d. means for transferring data and control characters from said central processor memory to said buffer memory,
   e. a peripheral utilization device,
   f. means responsive to said control characters for dynamically expanding the data in said buffer memory so as to form a logical memory which appears to the peripheral utilization device as a memory of relatively larger size than said buffer memory,
   g. said means for dynamically expanding including means for scanning successive portions of said buffer memory, and
   h. said means for scanning successive portions of said buffer memory including a storage address register for storing an address at which a scan of said buffer memory will begin.

5. A method as set forth in claim 4 wherein said buffer memory includes a memory address register and a storage address register, further comprising:
   a. storing the beginning address of a print scan in said storage address register,
   b. transferring said address to said memory address register to initiate a print scan, and
   c. transferring to said storage address register at the completion of a print line, an address related to the ending address of said memory address register.

6. In a data processing system having a central processor, a memory and a peripheral unit comprising a printer and a buffer memory, said buffer memory capable of storing a plurality of lines of print and control characters:
   a. means for addressing said buffer memory,
   b. storage means connected to said means for addressing for storing an address,
   c. means, responsive to said printer for establishing an address in said storage means, and
   d. means for transferring an address from said storage means to said means for addressing.

7. A data processing system as set forth in claim 6 further comprising:
   a. a print register for storing a character to be compared with the contents of said buffer memory, and
   b. means for entering a character representing a number into said print register indicative of a number of spaces to be printed.

8. In a keyboard to tape data preparation system having a central control unit with a memory, an input/output bus, a traffic controller and a tape unit, said traffic controller generating addresses for said tape unit and connected thereto via said input/output bus:
   a. a printer having a buffer memory and a control unit therefor connected to said traffic controller via said input/output bus,
   b. means, responsive to an address, for holding said central control unit at the address of said printer,
   c. means for transferring data from said central control unit memory to said buffer memory during said holding period, and d. means for releasing said central control unit when said data has been transferred and before a print cycle has begun.

9. In a data processing system having a central processor and a peripheral printer, said peripheral printer having a buffer memory and a print register for storing a character to be printed during a scan of said buffer memory, a method for dynamically expanding data in said buffer memory to simulate to said printer a logical memory substantially larger than said buffer memory comprising:

a. providing control characters in said buffer memory,
b. decoding said control characters to indicate the presence of a number of spaces,
c. placing a character representative of the number of said spaces in said print register, and
d. decrementing said print register to produce each space until a zero results in said print register.

10. In a data processing system having a central processor and a memory, a. a printer connected to said central processor,
b. said printer having a buffer memory and a print register for storing a character to be compared with the contents of said buffer memory,
c. means for loading said buffer memory with data and control characters from said memory,
d. scanning means for scanning the contents of said buffer memory,
e. means under control of said control characters for expanding the data in said buffer memory to simulate a buffer memory of larger size by entering a number into said print register indicative of a number of spaces to be printed by said printer.

11. In a data processing system having a central processor with a memory and a printer having a buffer memory; means for simulating a large memory with said buffer memory comprising:

a. means for transferring data and control characters from said memory to said buffer memory,
b. decoding means for interpreting specified control characters stored in said buffer memory,
c. a print register for storing a character to be compared with the contents of said buffer memory, and
d. means, responsive to said decoding means, for entering a character representative of a number of spaces to be printed into said print register.

12. A data processing system as set forth in claim 11 further comprising:

a. means for addressing said buffer memory,
b. storage means connected to said means for addressing for storing an address,
c. means, responsive to said printer for establishing an address in said storage means, and
d. means for transferring an address from said storage means to said means for addressing.

* * * * *